(12) United States Patent
Barnes

(10) Patent No.: US 7,548,487 B2
(45) Date of Patent: Jun. 16, 2009

(54) DIAGONAL GATHER TRACE INTERPOLATION

(75) Inventor: Simon Rice Barnes, Berkshire (GB)

(73) Assignee: PGS Geophysical AS, Lysaker (NO)

( * ) Notice: Subject to any disclaimer, the term of this patent is extended or adjusted under 35 U.S.C. 154(b) by 158 days.

(21) Appl. No.: 11/654,479

(22) Filed: Jan. 17, 2007

(65) Prior Publication Data

US 2008/0172181 A1    Jul. 17, 2008

(51) Int. Cl.
*G01V 1/30* (2006.01)
(52) U.S. Cl. ............................. 367/38; 702/16; 367/63
(58) Field of Classification Search .................. 367/38, 367/63, 73; 702/16, 17
See application file for complete search history.

(56) References Cited

U.S. PATENT DOCUMENTS

| | | | | |
|---|---|---|---|---|
| 4,964,098 | A * | 10/1990 | Hornbostel | 367/73 |
| 5,235,556 | A * | 8/1993 | Monk et al. | 367/63 |
| 5,617,372 | A * | 4/1997 | Gulunay et al. | 367/38 |
| 5,648,938 | A | 7/1997 | Jakubowicz | |
| 6,193,661 | B1 * | 2/2001 | Clark et al. | 600/443 |
| 6,510,390 | B1 * | 1/2003 | Bunting et al. | 702/14 |

OTHER PUBLICATIONS

Claerbout, J.F., *Fundamentals of Geophysical Data Processing*, 1976, pp. 246-256, McGraw-Hill Book Co, Inc., New York.
Shonewille, Michel, "Regularization with azimuth time-shift correction", 2003, pp. 1917-1920, SEG Expanded Abstracts.
Drecun, et al., "Three-Dimensional Interpolation of Traces with Constant Source-to Receiver Offset Distances", SEG Expanded Abstracts, vol. 5, pp. 363-366.
Stephen Jennings, United Kingdom Patent Office Search Report, dated May 8, 2008.

* cited by examiner

*Primary Examiner*—Ian J Lobo
(74) *Attorney, Agent, or Firm*—E. Eugene Thigpen

(57) ABSTRACT

Diagonal gather trace interpolation systems and methods are disclosed. In some embodiments, the method includes obtaining seismic traces from a marine seismic survey performed using typically two seismic sources fired in a flip-flop pattern. The seismic traces are processed in common field file trace groups from each cable by performing trace interpolation in opposing diagonal directions. Among other things, diagonal trace interpolation may improve azimuthal regularization. In any event, the disclosed interpolation methods maintain spatial bandwidth increased spatial resolution with increased inline and crossline sampling components. Diagonal gather trace interpolation exploits reduced input trace separation to provide improved stability and detection of a greater range of formation dip angles. After interpolation and regularization, the seismic traces may be imaged and interpreted for improved seismic exploration and monitoring.

11 Claims, 5 Drawing Sheets

DIAGONAL GATHER TRACE INTERPOLATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Seismology is used for exploration, archaeological studies, and engineering projects that require geological information. Exploration seismology provides data that, when used in conjunction with other available geophysical, borehole, and geological data, can provide information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Seismology employs artificially generated seismic waves to map subsurface structures. The seismic waves propagate from a source down into the earth and reflect from boundaries between subsurface structures. Seismic energy receivers detect and record reflected seismic waves for later analysis. Though some large-scale structures can often be perceived from a direct examination of the recorded signals, the recorded signals must be processed to remove distortion and reveal finer detail in the subsurface image. Among the available processing techniques for marine seismic surveys is a regularization technique to remove azimuthal effects on the seismic traces. As described by Michel Schonewille in "Regularization with azimuth time-shift correction", SEG 2003, regularization eliminates survey artifacts due to the effect of azimuthal differences that arise when small navigational changes in position and direction occur. However, it has been discovered that the performance of some regularization algorithms is sensitive to the interpolation technique employed beforehand, and that existing interpolation techniques can be inadequate or expensive.

BRIEF DESCRIPTION OF THE DRAWINGS

A better understanding of the various disclosed embodiments can be obtained when the following detailed description is considered in conjunction with the following drawings, in which.

Figure 1:
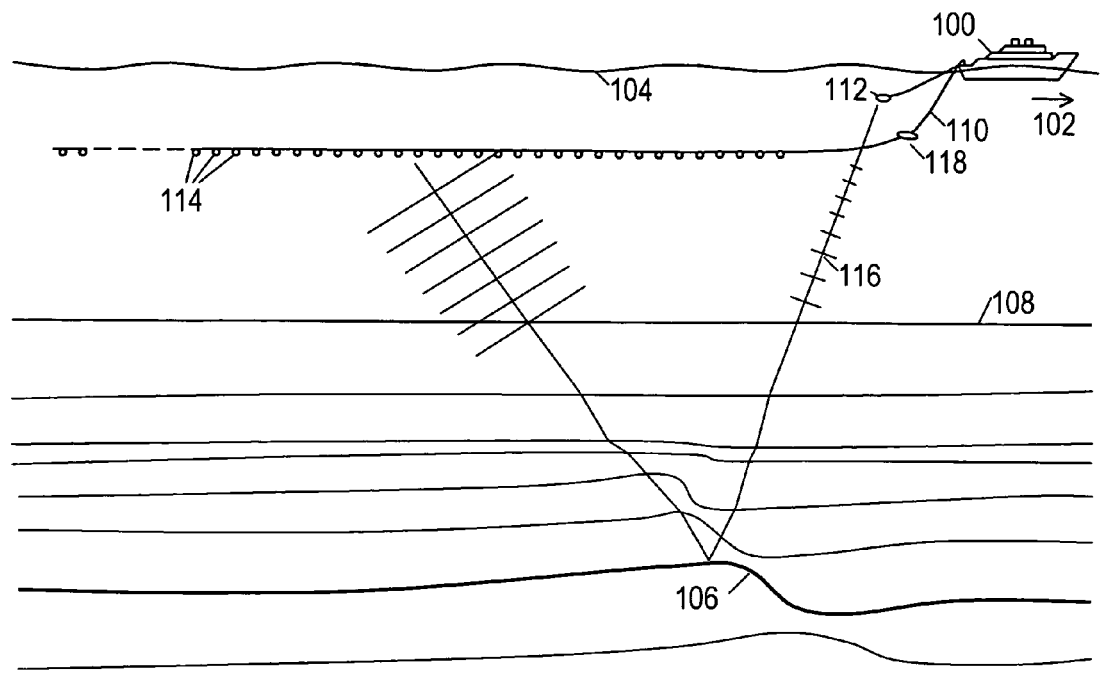
FIG. 1 shows a side view of an illustrative marine seismic survey environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Described herein are diagonal gather trace interpolation systems and methods that support enhanced performance of regularization algorithms. The disclosed interpolation methods provide better spatial bandwidth by increasing the inline and crossline sampling. In addition, the disclosed interpolation methods exploit reduced input trace separation leading to greater stability and the unwrapping of aliased frequencies in structurally complex zones. Smooth variation of midpoint increments are maintained within the diagonal gathers so that the effect of the acquisition footprint is minimized. The sorting of shot-ordered input data to diagonal gathers and back to shots again after trace interpolation only requires the storage in memory of a cable length along a sail line, allowing for efficient processing.

Exploration seismology is routinely performed both on land and at sea. At sea, seismic survey ships deploy streamers behind the ship as shown in FIG. 1. Each streamer 110 trails behind the ship 100 as the ship moves forward (in the direction of arrow 102), and each streamer includes multiple evenly-spaced receivers 114. Each streamer 110 may further include a programmable diverter 118 and programmable depth controllers that pull the streamer out to an operating offset distance from the ship's path (see FIG. 2) and down to an operating depth (FIG. 1).

Streamers 110 may be up to several kilometers long, and are usually constructed in sections 25 to 100 meters in length that include groups of up to 35 or more uniformly spaced receivers. Each streamer 110 includes electrical or fiber-optic cabling for interconnecting receivers 114 and the seismic equipment on ship 100. Data is digitized near the receivers 114 and transmitted to the ship 100 through the cabling at rates of 7 (or more) million bits of data per second.

As shown in FIG. 1, seismic survey ship 100 also tows a source 112. Source 112 may be an impulse source or a vibratory source. The receivers 114 used in marine seismology are commonly referred to as hydrophones, and are usually constructed using a piezoelectric transducer. Various suitable types of hydrophones are available such as disk hydrophones and cylindrical hydrophones. Source 112 and receivers 114 typically deploy below the ocean's surface 104. Processing equipment aboard the ship controls the operation of the source and receivers and records the acquired data.

Seismic surveys provide data for imaging below the ocean surface 104 and include subsurface structures such as structure 106, which lies below the ocean floor 108. Certain seismic characteristics of recorded seismic data are indicative of oil and/or gas reservoirs.

To image the subsurface structure 106, source 112 emits seismic waves 116 that are reflected where there are changes in acoustic impedance contrast due to subsurface structure 106 (and other subsurface structures). The reflected waves are detected by a pattern of receivers 114. By recording the elapsed time for the seismic waves 116 to travel from source 112 to subsurface structure 106 to receivers 114, an image of subsurface structure 106 can be obtained after appropriate data processing.

Figure 2:
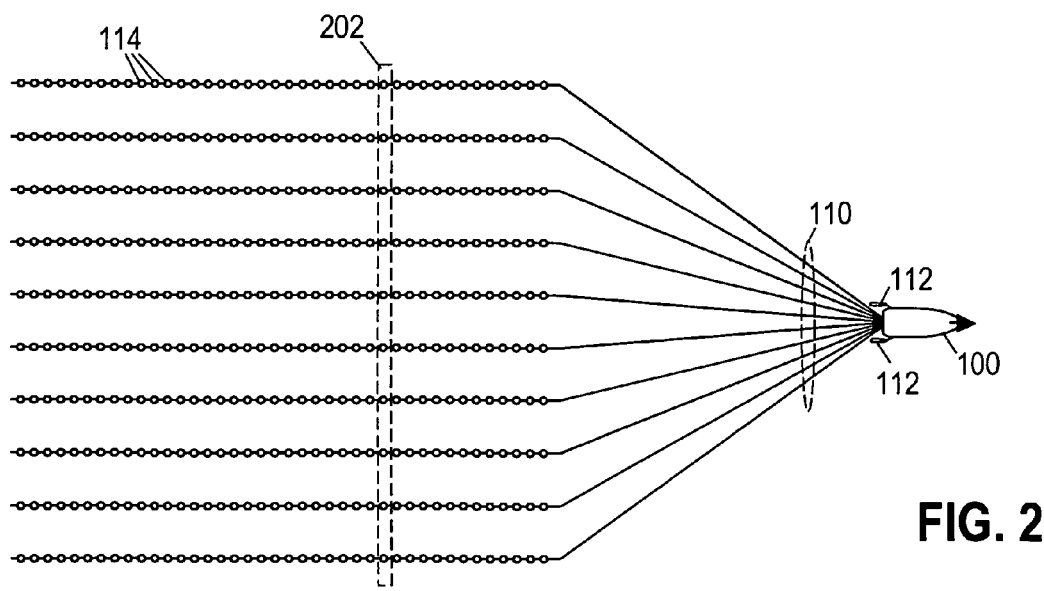
FIG. 2 shows a top view of an illustrative marine seismic survey environment.

FIG. 2 shows an overhead view (not to scale) of the seismic survey ship 100 towing a set of streamers 110 and two sources 112. As the ship 100 moves forward, the sources are triggered alternately in a so-called flip-flop pattern, as discussed below. Programmable diverters are used to provide roughly even spacing between the streamers. The receivers at a given position on the streamers are associated with a common field file trace number or common channel 202. This grouping of receivers is useful for the explanations that follow.

Figure 3:
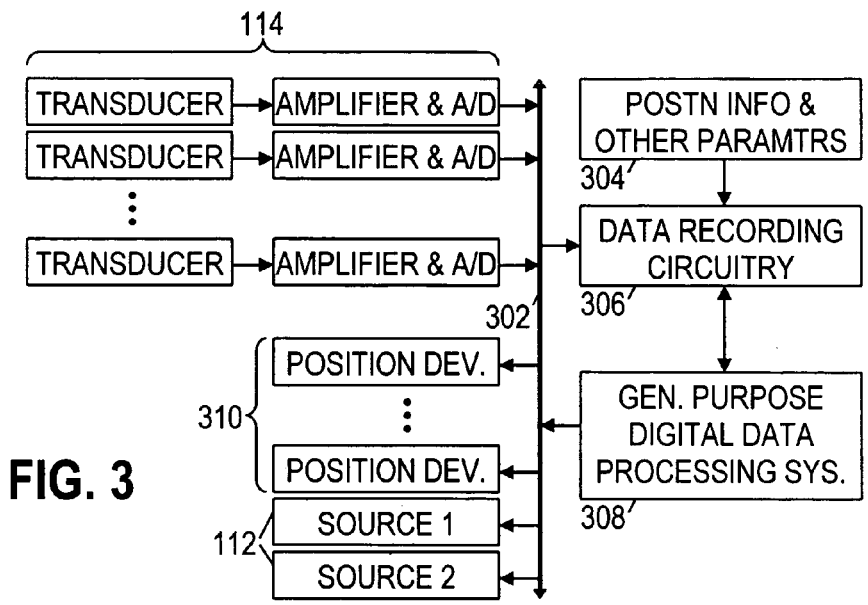
FIG. 3 shows an illustrative seismic survey recording system.

FIG. 3 shows an illustrative seismic survey recording system having the receivers 114 coupled to a bus 302 to communicate digital signals to data recording circuitry 306 on survey ship 100. Position information and other parameter sensors 304 are also coupled to the data recording circuitry 306 to enable the data recording circuitry to store additional information useful for interpreting the recorded data. Illustratively, such additional information may include array orientation information and velocity information.

A general purpose digital data processing system 308 is shown coupled to the data recording circuitry 306, and is further shown coupled via bus 302 to positioning devices 310 and seismic sources 112. Processing system 308 configures the operation of recording circuitry 306, positioning devices 310, and seismic sources 112. Recording circuitry 306 acquires the high speed data stream(s) from receivers 114 onto a nonvolatile storage medium such as a storage array of optical or magnetic disks. Positioning devices 310 (including programmable diverters and depth controllers) control the position of receivers 114 and sources 112.

The seismic recording system of FIG. 3 may include additional components not specifically shown here. For example, processing system 308 may include a user interface having a graphical display and a keyboard or other method of accepting user input. Each streamer 110 may have an independent bus 302 for coupling to the data recording circuitry. Processing system 308 may further include a network interface for communicating stored seismic survey data to a central computing facility having powerful computing resources for processing the seismic survey data.

Figure 4:
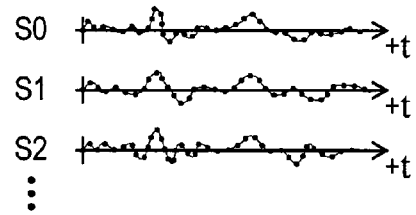
FIG. 4 shows an illustrative set of traces.

FIG. 4 shows illustrative seismic signals (also called "traces") detected and sampled by receivers 114. The signals indicate some measure of seismic wave energy as a function of time (e.g., displacement, velocity, acceleration, pressure), and they are digitized at high resolution (e.g., 24 bits) at a programmable sampling rate. Such signals can be grouped in different ways, and when so grouped, they are called a "gather". For example, a "shot gather" is the group of signals recorded for a single firing of the seismic source.

For quality control purposes, the averaging, or "stacking", of traces that share a common midpoint is normally carried out to improve the signal-to-noise ratio. Such traces may have different offsets (i.e., distances between source and receiver), which implies that the seismic waves have propagated at different angles to and from the formations of interest. To compensate for the resulting differences in travel time, traces are commonly subjected to a normal move-out ("NMO") correction that applies a changing time shift to each trace based on the offset distance. Stacking may then be performed with the NMO-corrected traces.

Figure 5:
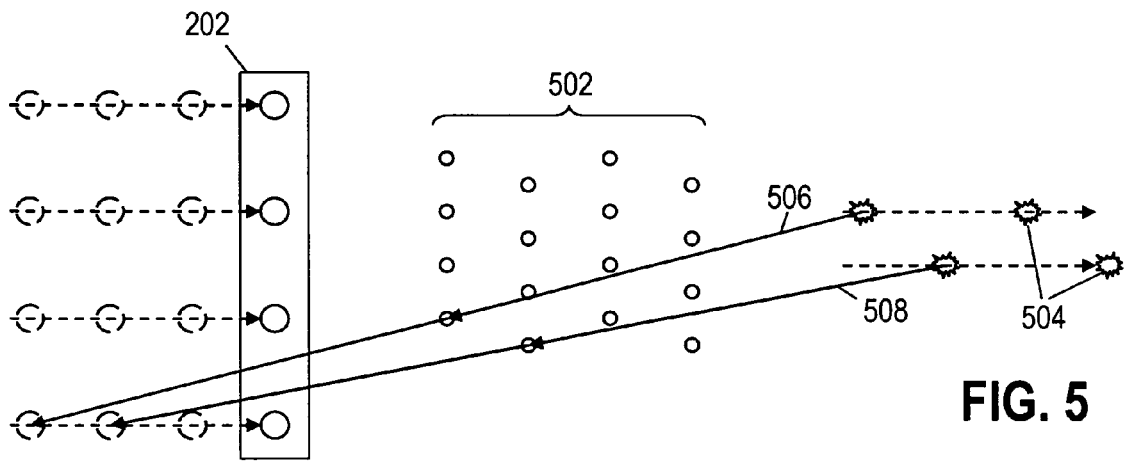
FIG. 5 shows an illustrative midpoint pattern that result from flip-flop shots received by a given channel.

Whether or not common midpoint stacking is employed, seismic surveys are often analyzed in terms of the resulting midpoint pattern to ensure that adequate coverage is being obtained. FIG. 5 shows an illustrative midpoint pattern 502 resulting from four receivers on a common field file trace number or common channel 202. The receivers are in motion, and are shown at four time instants corresponding to the source firings 504. Sources 112 are also in motion and are being fired alternately as shown by the pattern of source firings 504. In FIG. 5, each source firing produces four traces (one for each of the four receivers). The location of one midpoint is shown where ray 506 intersects the midpoint pattern 502, and the location of a subsequent midpoint is shown by ray 508. Note that the alternating firing pattern of sources causes the midpoints for traces measured by a given receiver to be staggered, so that the midpoints have a diamond pattern. It may be noted that similar patterns will be generated for other receiver channels, and in the overall survey pattern, those patterns will be intermixed with the pattern shown.

Midpoint patterns such as pattern 502 have traces for specific midpoints. For various reasons, it may be desirable to determine traces for positions other than those already available. Such reasons may include a desire to correct for survey problems to replace missing midpoints or to adjust midpoints that have been shifted during the survey process. Another reason may be a desire for a different midpoint pattern than that provided by the survey if, for example, an imaging algorithm has specific input requirements. Yet another reason may be to increase the spatial sampling frequency of the survey. The determination of such traces may be performed by interpolation, preferably after NMO correction. See, e.g., U.S. Pat. No. 5,648,938 (Jakubowicz, Jul. 15, 1997). Various interpolation techniques exist and may be employed. Suitable interpolation techniques apply a spatial (between traces) and time-based (along the traces) filter to the existing traces to generate the interpolated traces. Suitable filters include linear, quadratic, or spline interpolation filters as well as FK and FX based filters that unwrap spatially aliased frequencies.

Figure 6:
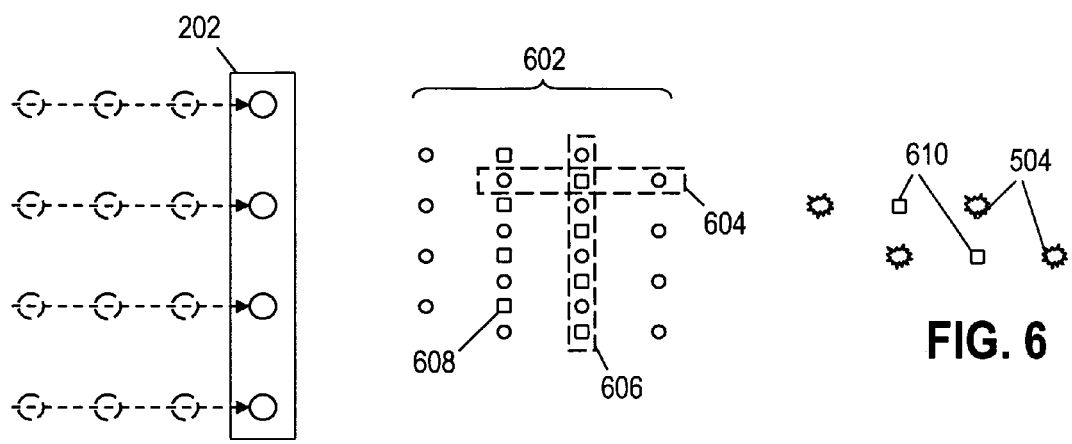
FIG. 6 illustrates in-line and cross-line trace interpolation.

FIG. 6 shows a midpoint pattern 602 that can be derived from the midpoint pattern 502 (FIG. 5) by interpolating between existing traces in an inline direction 604 and/or in a crossline direction 606. The resulting interpolated traces may be located at points 608 halfway between existing midpoints to obtain a rectangular grid pattern of midpoints. (It is noted that interpolating in this fashion provides predicted traces that would have resulted from firing the sources at the additional firing positions 610 for the existing moving receivers 114 and/or corresponding additional receiver locations 611).

Interpolation in the fashion of FIG. 6 may be unsatisfactory if the spacing of the input midpoints becomes undesirably large for accurate trace interpolation. Moreover, the midpoint pattern created after the interpolation can be very dense making it expensive to process.

Figure 7:
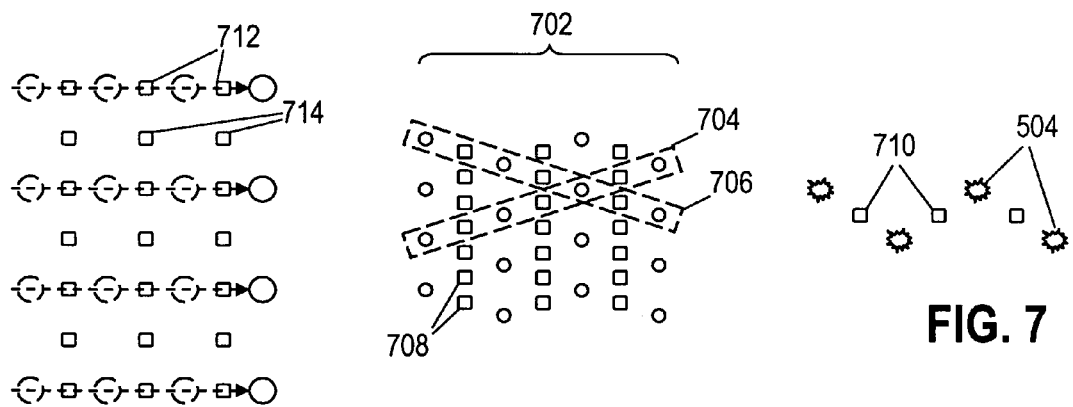
FIG. 7 illustrates diagonal gather trace interpolation.

Accordingly, FIG. 7 shows a preferred midpoint pattern 702 prior to regularization that can be derived from the midpoint pattern of FIG. 5 by interpolating between existing traces in diagonal directions 704 and 706. The resulting interpolated traces may be located at points 708 halfway between existing midpoints to obtain an open-cell diamond pattern of midpoints. (It is noted that interpolating in this fashion provides predicted traces that would have resulted from firing the sources at additional firing positions 710 and receiving the signals at additional exclusive receiver positions 712 and 714.)

The diagonal interpolation approach exploits the fact that in the diagonal direction, the input midpoint trace spacing is smaller than in the inline direction for common channel interpolation. In addition, this approach does not depend on the shot/receiver ratio being a positive integer (unlike some interpolation techniques performed in another sort domain). The reduced spacing enables more robust interpolation. In addition, the interpolated traces have both inline and crossline components that are not present in the original midpoint pattern. As mentioned previously, these additional components may prove helpful for certain regularization methods.

Figure 8:
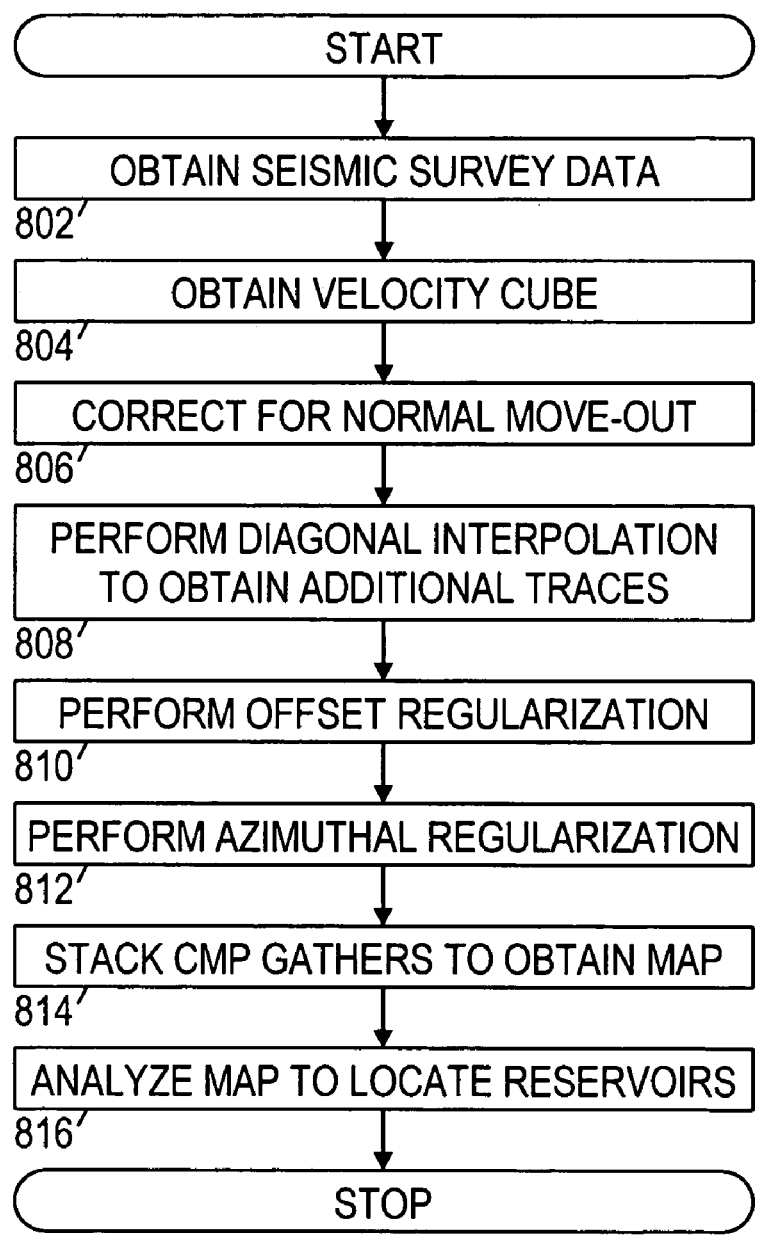
FIG. 8 shows a flowchart of an illustrative seismic imaging method.

FIG. 8 shows a flowchart of an illustrative exploration method employing diagonal gather trace interpolation. In block 802, a computer obtains the seismic survey data. The seismic survey data, which may have been gathered as outlined previously, is generally stored in a structured form in a disk array to enable high bandwidth accessibility by a parallel processing computer system. In block 804, the computer obtains a velocity cube, i.e., an indication of seismic velocities at each point in the region of interest. The velocity cube can be derived from the seismic survey data using known techniques. See, e.g., Jon F. Claerbout, *Fundamentals of Geophysical Data Processing*, p. 246-256, which is hereby incorporated herein by reference. Alternatively, the velocity cube may be independently available from other sources, e.g., well logs.

In block 806, the computer applies a normal move-out correction to the seismic traces. As previously mentioned, the normal move-out (NMO) correction is a time-shifting operation to account for time delays attributable to offset distance between the source and receiver. In block 808, the computer performs trace interpolation along the diagonals of the midpoint array for a common field file trace number or common channel from each cable (e.g. 202 shown in FIG. 2). Such interpolation may be performed using a spatial dealiasing operator that is designed and applied within overlapping windows both in space and time.

In some embodiments, diagonal gather trace interpolation is first performed to replace any traces that are missing or corrupted in the seismic survey data. (After such replacement, diagonally adjacent points correspond to signals received from different sources 112.) Diagonal gather interpolation can be applied to a set of common channel input traces that have a complete or "filled in" midpoint pattern. The resulting midpoint array preferably includes the midpoints for the original traces and at least one additional midpoint for an interpolated trace between each original pair of diagonally adjacent midpoints. In some method embodiments, there is exactly one additional trace generated having a midpoint halfway between each such pair, while in other embodiments, there are multiple additional traces generated having midpoints evenly spaced between each such pair.

In block 810, the computer performs offset regularization so that an accurate azimuthal regularization can be subsequently carried out. Offset regularization is typically performed for each shot/cable gather although other sort domains may also be used. It is noted that after offset regularization, the coordinates of the traces will have been modified including their midpoint positions.

After the offsets have been regularized, azimuthal regularization is carried out in block 812. Such regularization may be performed as described by Michel Schonewille in "Regularization with azimuth time-shift correction", SEG 2003. The spatial bandwidth of this type of regularization is fully maintained when preceded by diagonal trace interpolation as described above with reference to block 808.

The regularized seismic traces can be used to great benefit for subsequent processing and interpolation (blocks 813 to 816) as the acquisition footprint has been removed. The final imaged volume can be examined in block 816 by a user or in some cases a computer to locate hydrocarbon reservoirs or mineral deposits within the mapped region of interest.

It is contemplated that the operations shown in FIG. 8 may be implemented in the form of software, which can be stored in computer memory, in long-term storage media, and/or in portable information storage media. It should be noted that illustrative method of FIG. 8 is provided as an explanatory aid. In practice, the various operations shown in FIG. 8 may be performed in different orders and are not necessarily sequential. For example, seismic data processing can benefit substantially from parallelism. In some processing method embodiments, data from different survey regions may be processed independently. In other embodiments, the operations may be "pipelined" so that individual trace data experiences the operations in the sequence shown, even though the operations are all occurring concurrently. Even for individual traces, the operations are not necessarily performed in the order shown. Additional operations may be added to the illustrative method and/or several of the operations shown may be omitted.

Figure 9:
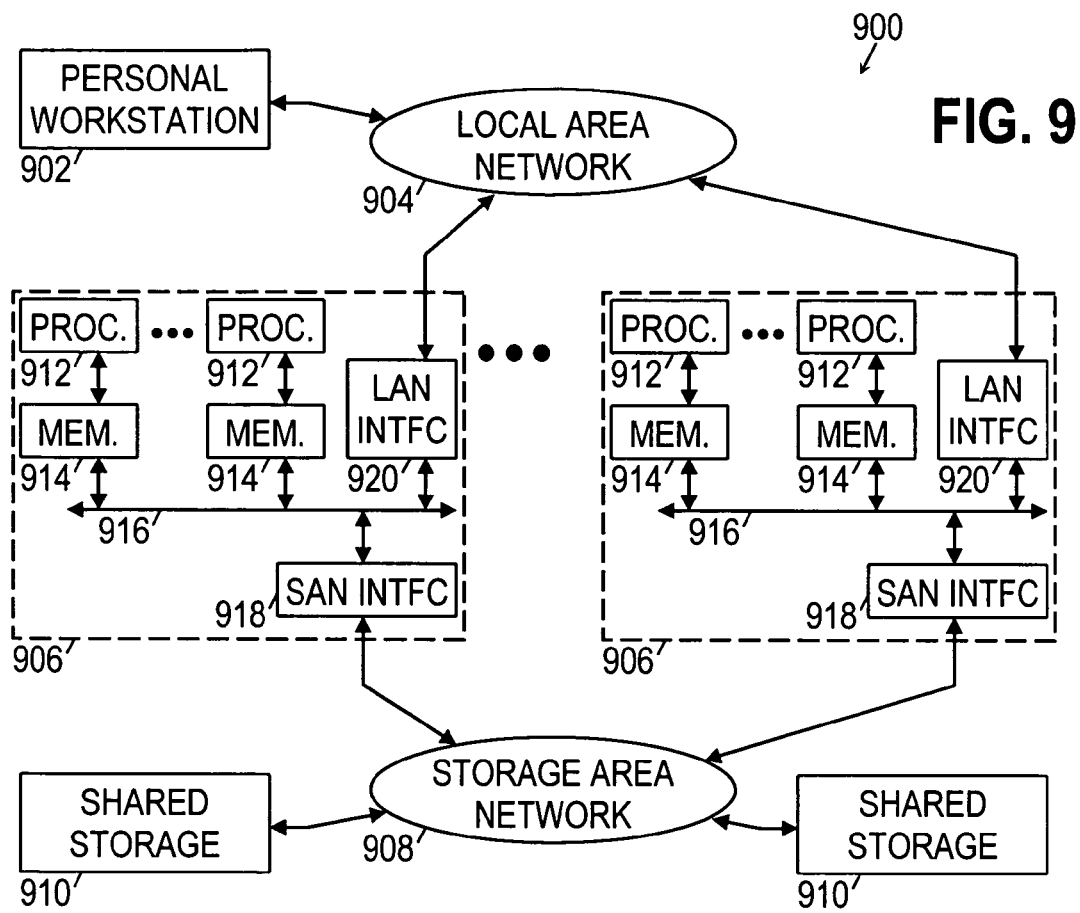
FIG. 9 shows an illustrative imaging system.

FIG. 9 shows an illustrative computer system 900 for performing seismic data processing including diagonal trace interpolation. A personal workstation 902 is coupled via a local area network (LAN) 904 to one or more multi-processor computers 906, which are in turn coupled via a storage area network (SAN) 908 to one or more shared storage units 910. Personal workstation 902 serves as a user interface to the processing system, enabling a user to load survey data into the system, to retrieve image data from the system, and to configure and monitor the operation of the processing system. Personal workstation 902 may take the form of a desktop computer with a graphical display that graphically shows survey data and 3D images of the survey region, and with a keyboard that enables the user to move files and execute processing software.

LAN 904 provides high-speed communication between multi-processor computers 906 and with personal workstation 902. The LAN 904 may take the form of an Ethernet network.

Multi-processor computer(s) 906 provide parallel processing capability to enable suitably prompt conversion of seismic trace signals into a survey region image. Each computer 906 includes multiple processors 912, distributed memory 914, an internal bus 916, a SAN interface 918, and a LAN interface 920. Each processor 912 operates on an allocated portion of the input data to produce a partial image of the seismic survey region. Associated with each processor 912 is a distributed memory module 914 that stores conversion software and a working data set for the processor's use. Internal bus 916 provides inter-processor communication and communication to the SAN or LAN networks via the corresponding interfaces 918, 920. Communication between processors in different computers 906 can be provided by LAN 904.

SAN 908 provides high-speed access to shared storage devices 910. The SAN 908 may take the form of a Fibrechannel or Infiniband network. Shared storage units 910 may be large, stand-alone information storage units that employ magnetic disk media for nonvolatile data storage. To improve data access speed and reliability, the shared storage units 910 may be configured as a redundant disk array.

Shared storage units 910 initially store a velocity cube and seismic traces. Each processor 912 retrieves a group of seismic traces and the velocity cube from shared storage units 910. For NMO correction, diagonal trace interpolation, and regularization operations (blocks 806-812), each processor may retrieve seismic traces in common field file trace or channel groups. The common channel groups may be divided into (slightly overlapping) spatial regions, with the processing for blocks 806-812 being performed within each region and stored back to shared storage 910 before the next region is processed. Thereafter, the traces can be sorted back to shot and/or CMP gathers for QC purposes and further processing.

In response to a request from the workstation 902, the map data can be retrieved by computers 906 and supplied to workstation for conversion to a graphical image to be displayed to a user.

Numerous variations and modifications will become apparent to those skilled in the art once the above disclosure is fully appreciated. It is intended that the following claims be interpreted to embrace all such variations and modifications.

What is claimed is:

1. A seismic exploration method that comprises:
    obtaining seismic trace data from a common field file trace number or common channel across multiple receiver lines captured in response to multiple source events so that an arrangement of midpoints associated with the seismic trace data includes diagonally adjacent midpoints;
    interpolating between seismic traces corresponding to diagonally adjacent midpoints to obtain diagonally interpolated traces; and
    generating a final image based at least in part on the diagonally interpolated traces.

2. The method of claim 1, wherein said interpolating includes applying a space and time domain filter to seismic traces associated with diagonally adjacent midpoints.

3. The method of claim 1, further comprising:
    correcting seismic traces for normal move-out before said interpolating.

4. The method of claim 1, further comprising:
    performing offset regularization on the seismic trace data.

5. The method of claim 1, further comprising:
    employing the diagonally interpolated traces after offset regularization to perform azimuthal regularization.

6. The method of claim 1, wherein the receiver lines are streamers and the source events are generated by alternate firings of at least one marine seismic source.

7. The method of claim 6, wherein the arrangement of midpoints for each common channel is a substantially diamond pattern.

8. The method of claim 1, wherein said generating a final image includes:
    performing offset regularization on a set of seismic data traces including the interpolated traces;
    performing azimuthal regularization on the offset-regularized set of seismic data traces;
    stacking gathers of traces from the azimuthally-regularized set of seismic data traces to obtain a final migrated volume.

9. A seismic imaging method that comprises:
    obtaining seismic traces from a marine seismic survey performed using at least one seismic source or two fired in a flip-flop pattern;
    processing common channel sets of seismic traces using diagonal trace interpolation;
    producing a final migrated volume based at least in part on the processed seismic traces.

10. The method of claim 9, wherein said processing also includes:
    correcting for normal move-out;
    interpolating to fill in holes in a midpoint pattern attributable to missing or corrupted data; and
    performing offset regularization followed by azimuthal regularization.

11. The method of claim 10, wherein said processing further includes:
    applying a time- and space-domain filter to traces having diagonally adjacent midpoints to provide diagonally interpolated traces.

* * * * *